US012118970B2

(12) United States Patent
Heikkinen et al.

(10) Patent No.: US 12,118,970 B2
(45) Date of Patent: Oct. 15, 2024

(54) COMPENSATING NOISE REMOVAL ARTIFACTS

(71) Applicant: Nokia Technologies Oy, Espoo (FI)

(72) Inventors: Mikko Olavi Heikkinen, Tampere (FI); Miikka Tapani Vilermo, Siuro (FI); Arto Juhani Lehtiniemi, Tampere (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/974,602

(22) Filed: Oct. 27, 2022

(65) Prior Publication Data

US 2023/0138240 A1 May 4, 2023

(30) Foreign Application Priority Data

Nov. 3, 2021 (GB) ..................................... 2115772

(51) Int. Cl.

*H04R 5/02* (2006.01)
*G10K 11/16* (2006.01)
*H04S 7/00* (2006.01)
*H03G 3/00* (2006.01)

(52) U.S. Cl.

CPC ................ *G10K 11/16* (2013.01); *H04S 7/00* (2013.01)

(58) Field of Classification Search

CPC ................................. G10K 11/16; H04S 7/00
USPC .................................................. 381/303, 107
See application file for complete search history.

(56) References Cited

U.S. PATENT DOCUMENTS

| | | | | |
|---|---|---|---|---|
| 9,584,912 | B2 | 2/2017 | Koppens et al. | |
| 2014/0098968 | A1* | 4/2014 | Furuta | G10L 21/0232 381/71.12 |
| 2021/0035597 | A1* | 2/2021 | Eubank | H04S 7/304 |
| 2023/0009878 | A1* | 1/2023 | Port | G10L 25/60 |

FOREIGN PATENT DOCUMENTS

| | | | | |
|---|---|---|---|---|
| GB | 2584838 | A * | 12/2020 | G10L 19/008 |

* cited by examiner

*Primary Examiner* — Ammar T Hamid
(74) *Attorney, Agent, or Firm* — Harrington & Smith

(57) ABSTRACT

An apparatus including circuitry configured to: obtain at least two audio signals; determine, with respect to the at least two audio signals, an audio object part and an ambience audio part; determine a level parameter based on the ambience audio part; apply a noise suppression to the audio object part, wherein the noise suppression is configured to be controlled based on the determined level parameter; and generate a noise suppressed audio object part based on the applied noise suppression.

20 Claims, 13 Drawing Sheets

COMPENSATING NOISE REMOVAL ARTIFACTS

FIELD

The present application relates to apparatus and methods for compensating noise removal artifacts, and specifically for compensating noise removal artifacts in the removal of noise sources such as wind noise, background noise, motor noise, and handling noise.

BACKGROUND

Audio objects can be provided as a spatial audio capture process where an audio scene is captured by microphones and the captured audio signals are then analysed to determine spatial audio signals comprising a number (1-N) of audio objects (where N is, e.g., 5). Each of the objects have an individual audio signal and metadata describing its (spatial) features. The metadata may be a parametric representation of audio object characteristics and may include such parameters as the direction of the audio object (e.g., azimuth and elevation angles). Other examples include the distance, the spatial extent, and the gain of the object.

It is known that audio capture quality can be increased with the application of noise suppression techniques. Thus for example there are known noise suppression techniques for the suppression of noise sources such as wind noise, background noise (e.g., ventilation noise, traffic), motor noise (e.g., camera autofocus motor), and handling noise. These noise sources generally require different techniques in their suppression.

The audio objects can be used as an input format for codecs such as Immersive Voice and Audio Services (IVAS) codec.

SUMMARY

There is provided according to a first aspect an apparatus comprising means configured to: obtain at least two audio signals; determine, with respect to the at least two audio signals, an audio object part and an ambience audio part; determine a level parameter based on the ambience audio part; apply a noise suppression to the audio object part, wherein the noise suppression is configured to be controlled based on the determined level parameter; and generate a noise suppressed audio object part based on the applied noise suppression.

The means may be further configured to: combine the noise suppressed audio object part and the ambience audio part to generate an output audio signal; and output and/or store the output audio signal.

The means may be configured to separate the at least two audio signals into the determined respective audio object part and ambience audio part, the means may be configured to generate an audio object part audio signal based on a previous time level parameter.

The means configured to generate the audio object part audio signal based on the previous time level parameter may be configured to: determine an object separation direction parameter; determine a focuser configuration based on the object separation direction parameter and the previous time level parameter; apply the focuser configuration to the at least two audio signals to generate the audio object part audio signal.

The means configured to determine the focuser configuration based on the object separation direction parameter and the previous time level parameter may be configured to: generate a first focuser filter with a first spatial width based on the previous time level parameter being equal to or more than a first value; and generate a second focuser filter with a second spatial width based on the previous time level parameter being less than the first value, wherein the second spatial width is smaller than the first spatial width and the second focuser filter is more spatially selective than the first focuser filter.

The means configured to apply the focuser configuration to the at least two audio signals to generate the audio object part audio signal may be configured to be controlled based generate the ambience audio part by removing the audio object part audio signal from the at least two audio signals.

The means configured to apply the noise suppression to the audio object part, wherein the noise suppression may be configured to be controlled based on the determined level parameter is configured to: generate, with respect to a first time period, a first signal-to-noise ratio based on the audio object part of the at least two audio signals and the ambience audio part; generate, with respect to a second time period, a second signal-to-noise ratio based on the audio object part of the at least two audio signals and the ambience audio part, wherein the first time period is shorter than the second time period; combine the first and second signal-to-noise ratios to generate a combined signal-to-noise ratio; multiply the combined signal-to-noise ratio by a factor based on the level parameter to generate a noise suppression filter parameter; and apply a noise suppression filter with the noise suppression filter parameter to the audio object part.

The means configured to determine the level parameter based on the residual audio part may be configured to determine a level difference between the audio object part and ambience audio part.

The means configured to determine the level difference between the audio object part and ambience audio part may be configured to determine the level difference further based on the noise suppressed audio object part.

The means configured to determine the level parameter based on the ambience audio part may be configured to determine a level difference between the noise suppressed audio object part and the ambience audio part.

The means configured to determine the level parameter based on the ambience audio part may be configured to determine a level parameter based on an absolute level of the ambience audio part.

The means configured to determine the level parameter based on the ambience audio part may be configured to determine a level difference for defined or selected frequency bands.

The means configured to apply a noise suppression to the audio object part, wherein the noise suppression is configured to be controlled based on the determined level parameter may be configured to apply the noise suppression to the defined or selected frequency bands.

According to a second aspect there is provided a method for an apparatus comprising: obtaining at least two audio signals; determining, with respect to the at least two audio signals, an audio object part and an ambience audio part; determining a level parameter based on the ambience audio part; applying a noise suppression to the audio object part, wherein the noise suppression is configured to be controlled based on the determined level parameter; and generating a noise suppressed audio object part based on the applied noise suppression.

The method may further comprise: combining the noise suppressed audio object part and the ambience audio part to generate an output audio signal; and outputting and/or storing the output audio signal.

The method may further comprise separating the at least two audio signals into the determined respective audio object part and ambience audio part, wherein generating a noise suppressed audio object part based on the applied noise suppression may comprise generating an audio object part audio signal based on a previous time level parameter.

Generating the audio object part audio signal based on the previous time level parameter may comprise: determining an object separation direction parameter; determining a focuser configuration based on the object separation direction parameter and the previous time level parameter; and applying the focuser configuration to the at least two audio signals to generate the audio object part audio signal.

Determining the focuser configuration based on the object separation direction parameter and the previous time level parameter may comprise: generating a first focuser filter with a first spatial width based on the previous time level parameter being equal to or more than a first value; and generating a second focuser filter with a second spatial width based on the previous time level parameter being less than the first value, wherein the second spatial width is smaller than the first spatial width and the second focuser filter is more spatially selective than the first focuser filter.

Applying the focuser configuration to the at least two audio signals to generate the audio object part audio signal may comprise generating the ambience audio part by removing the audio object part audio signal from the at least two audio signals.

Applying the noise suppression to the audio object part, wherein the noise suppression is configured to be controlled based on the determined level parameter may comprise: generating, with respect to a first time period, a first signal-to-noise ratio based on the audio object part of the at least two audio signals and the ambience audio part; generating, with respect to a second time period, a second signal-to-noise ratio based on the audio object part of the at least two audio signals and the ambience audio part, wherein the first time period is shorter than the second time period; combining the first and second signal-to-noise ratios to generate a combined signal-to-noise ratio; multiplying the combined signal-to-noise ratio by a factor based on the level parameter to generate a noise suppression filter parameter; and applying a noise suppression filter with the noise suppression filter parameter to the audio object part.

Determining the level parameter based on the residual audio part may comprise determining a level difference between the audio object part and ambience audio part.

Determining the level difference between the audio object part and ambience audio part may comprise determining the level difference further based on the noise suppressed audio object part.

Determining the level parameter based on the ambience audio part may comprise determining a level difference between the noise suppressed audio object part and the ambience audio part.

Determining the level parameter based on the ambience audio part may comprise determining a level parameter based on an absolute level of the ambience audio part.

Determining the level parameter based on the ambience audio part may comprise determining a level difference for defined or selected frequency bands.

Applying a noise suppression to the audio object part, wherein the noise suppression is configured to be controlled based on the determined level parameter may comprise applying the noise suppression to the defined or selected frequency bands.

According to a third aspect there is provided an apparatus comprising at least one processor and at least one memory including a computer program code, the at least one memory and the computer program code configured to, with the at least one processor, cause the apparatus at least to: obtain at least two audio signals; determine, with respect to the at least two audio signals, an audio object part and an ambience audio part; determine a level parameter based on the ambience audio part; apply a noise suppression to the audio object part, wherein the noise suppression is configured to be controlled based on the determined level parameter; and generate a noise suppressed audio object part based on the applied noise suppression.

The apparatus may be further caused to: combine the noise suppressed audio object part and the ambience audio part to generate an output audio signal; and output and/or store the output audio signal.

The apparatus may be caused to separate the at least two audio signals into the determined respective audio object part and ambience audio part, the apparatus may be caused to generate an audio object part audio signal based on a previous time level parameter.

The apparatus caused to generate the audio object part audio signal based on the previous time level parameter may be caused to: determine an object separation direction parameter; determine a focuser configuration based on the object separation direction parameter and the previous time level parameter; apply the focuser configuration to the at least two audio signals to generate the audio object part audio signal.

The apparatus caused to determine the focuser configuration based on the object separation direction parameter and the previous time level parameter may be caused to: generate a first focuser filter with a first spatial width based on the previous time level parameter being equal to or more than a first value; and generate a second focuser filter with a second spatial width based on the previous time level parameter being less than the first value, wherein the second spatial width is smaller than the first spatial width and the second focuser filter is more spatially selective than the first focuser filter.

The apparatus caused to apply the focuser configuration to the at least two audio signals to generate the audio object part audio signal may be caused to be controlled based generate the ambience audio part by removing the audio object part audio signal from the at least two audio signals.

The apparatus caused to apply the noise suppression to the audio object part, wherein the noise suppression may be configured to be controlled based on the determined level parameter may be caused to: generate, with respect to a first time period, a first signal-to-noise ratio based on the audio object part of the at least two audio signals and the ambience audio part; generate, with respect to a second time period, a second signal-to-noise ratio based on the audio object part of the at least two audio signals and the ambience audio part, wherein the first time period is shorter than the second time period; combine the first and second signal-to-noise ratios to generate a combined signal-to-noise ratio; multiply the combined signal-to-noise ratio by a factor based on the level parameter to generate a noise suppression filter parameter; and apply a noise suppression filter with the noise suppression filter parameter to the audio object part.

The apparatus caused to determine the level parameter based on the residual audio part may be caused to determine a level difference between the audio object part and ambience audio part.

The apparatus caused to determine the level difference between the audio object part and ambience audio part may be caused to determine the level difference further based on the noise suppressed audio object part.

The apparatus caused to determine the level parameter based on the ambience audio part may be caused to determine a level difference between the noise suppressed audio object part and the ambience audio part.

The apparatus caused to determine the level parameter based on the ambience audio part may be caused to determine a level parameter based on an absolute level of the ambience audio part.

The apparatus caused to determine the level parameter based on the ambience audio part may be caused to determine a level difference for defined or selected frequency bands.

The apparatus caused to apply a noise suppression to the audio object part, wherein the noise suppression is configured to be controlled based on the determined level parameter may be caused to apply the noise suppression to the defined or selected frequency bands.

According to a fourth aspect there is provided an apparatus comprising: means for obtaining at least two audio signals; means for determining, with respect to the at least two audio signals, an audio object part and an ambience audio part; means for determining a level parameter based on the ambience audio part; means for applying a noise suppression to the audio object part, wherein the noise suppression is configured to be controlled based on the determined level parameter; and means for generating a noise suppressed audio object part based on the applied noise suppression.

According to a fifth aspect there is provided a computer program comprising instructions [or a computer readable medium comprising program instructions] for causing an apparatus to perform at least the following: obtain at least two audio signals; determine, with respect to the at least two audio signals, an audio object part and an ambience audio part; determine a level parameter based on the ambience audio part; apply a noise suppression to the audio object part, wherein the noise suppression is configured to be controlled based on the determined level parameter; and generate a noise suppressed audio object part based on the applied noise suppression.

According to a sixth aspect there is provided a non-transitory computer readable medium comprising program instructions for causing an apparatus to perform at least the following: obtain at least two audio signals; determine, with respect to the at least two audio signals, an audio object part and an ambience audio part; determine a level parameter based on the ambience audio part; apply a noise suppression to the audio object part, wherein the noise suppression is configured to be controlled based on the determined level parameter; and generate a noise suppressed audio object part based on the applied noise suppression.

According to a seventh aspect there is provided an apparatus comprising: obtaining circuitry configured to obtain at least two audio signals; determining circuitry configured to determine, with respect to the at least two audio signals, an audio object part and an ambience audio part; determining circuitry configured to determine a level parameter based on the ambience audio part; applying circuitry configured to apply a noise suppression to the audio object part, wherein the noise suppression is configured to be controlled based on the determined level parameter; and generating circuitry configured to generate a noise suppressed audio object part based on the applied noise suppression.

According to an eighth aspect there is provided a computer readable medium comprising program instructions for causing an apparatus to perform at least the following: obtain at least two audio signals; determine, with respect to the at least two audio signals, an audio object part and an ambience audio part; determine a level parameter based on the ambience audio part; apply a noise suppression to the audio object part, wherein the noise suppression is configured to be controlled based on the determined level parameter; and generate a noise suppressed audio object part based on the applied noise suppression.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
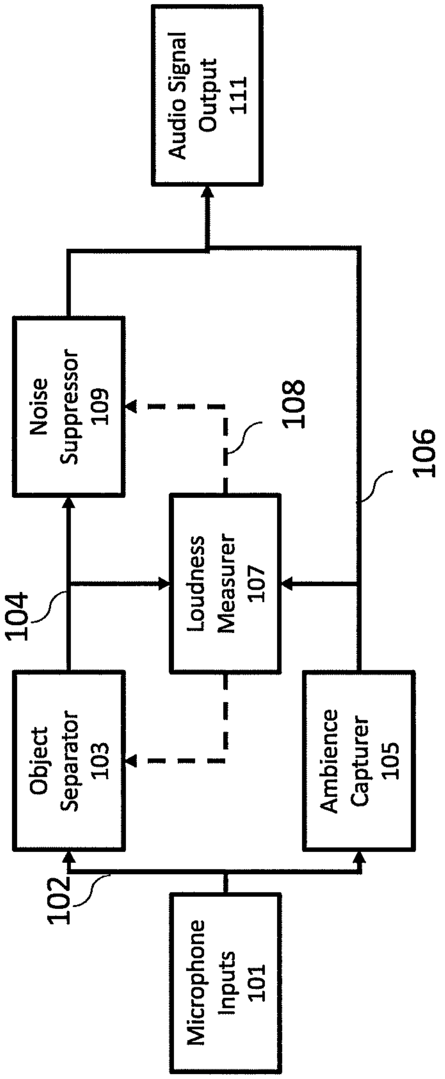
FIG. 1 shows schematically example apparatus suitable for implementing some embodiments.

The concept as discussed herein in further detail with respect to the following embodiments is related to the capture of audio scenes.

As described above an approach for audio capture and in particular spatial audio capture involves the analysis and processing of microphone audio signals to determine object associated audio signals and spatial parameters.

The audio signals from the microphones can thus be processed in order to separate the audio objects and further can have noise suppression applied.

However it is not possible to set the tuning parameters of object separation and noise suppression in a spatial audio capture system so that the results are optimal with every input signal. The tuning parameters required differ depending on the characteristics of the input content. As such the tuning parameters can be selected to provide an 'average' quality of the output or for a worst case performance of the algorithm.

Additionally there are tradeoffs or compromises from manual tuning related to the way the tuning parameters affect the output quality of object separation and noise reduction.

Beamforming the microphone audio signals, which is commonly used in object separation, can amplify certain types of noises present in the input microphone audio signals. The selection of beamforming parameters can be seen as a compromise between separation efficiency and amplified noise. In some embodiments beamforming may be seen as an example of focusing. Focusing means are thus configured to amplify the object sound with respect to the ambient sound using any available approaches, for example, beamforming, spatial filtering, machine learning methods etc. In the following examples beamformers and beamforming are described, however any suitable (spatial) focusing means can be employed.

For example, where the audio scene comprises a person speaking and an ambient sound, where the ambient sound level is moderate, a 'good' tuning for the beamformer coefficients can be one that produces a narrowest possible beamforming sector that includes the person speaking and a large attenuation outside the sector.

In another situation, where the audio scene comprises a person speaking and the ambient noise is caused by wind, a 'good' tuning for the beamforming coefficients is one that produces a wider beamforming sector and smaller attenuation outside the sector because as it will amplify the wind noise less.

The application of noise reduction typically introduces artifacts to some signals if the noise reduction control is set too high. The tradeoff with noise reduction is between the amount of noise removed from the input signal and the amount of artifacts added to the output signal.

In a system that separates object audio and ambient sound, the playback will mix both. The output quality is determined by the final mix. This means that the object audio is not heard separately but mixed with the ambient sound. The tuning tradeoffs should consider, what the perceived quality is when the object audio signals and ambience audio signals are combined together. As there are many possible variations for the combination of ambient audio signals and object audio signals the generation or determination of a generic 'preset' tuning that takes all the combinations into account is not practically possible.

The embodiments as described in further detail hereafter relate to control of noise suppression and object separation in spatial audio capture where there is provided an adaptive control mechanism to produce perceptually improved audio signals by providing adjustment of noise suppression and object separation parameters based on the spectral characteristics of the object audio and ambient sound. These embodiments furthermore attempt to prevent the compromises and artifacts produced by conventional manual object separation/noise reduction tuning. For example the embodiments attempt to reduce audible (object separation/noise reduction) processing artifacts or prevent the implementation of too conservative control settings that do not provide the 'maximum' (object separation/noise reduction) performance possible for the input content.

Thus the embodiments as described herein relate to apparatus and methods for capture processing of spatial audio where two or more microphones in a spatial audio capture device are used to capture a spatial audio signal which can be reproduced to a user enabling them to experience an audio signal with at least some of the spatial characteristics present at the location of the spatial audio capture device during audio capture.

In these embodiments there is proposed apparatus and methods for improving the quality of the spatial audio capture when the spatial audio capture contains audio object separation and noise suppression steps.

This in some embodiments is achieved by:

Obtaining at least two audio signals;

Determining (and separating) the at least two audio signals into at least one audio object (or direct) signal and a residual (or ambient) signal from the at least two audio signals;

Applying noise suppression on the audio object signal to obtain at least one noise suppressed object signal;

Based on the at least one audio object signal and residual signal determining a level difference;

Based on the at least one audio object signal determining a first amount of quality degradation caused by the separating the audio object signal from the residual signal;

Using at least one spatial characteristic of sound to determine the quality degradation;

Based on the at least one noise suppressed audio object signal determining a second amount of quality degradation caused by the noise suppression; and Adjusting at least a first parameter of the separating processing or a second parameter of the noise suppression processing based on at least one of the level difference, the first amount of quality degradation, or the second amount of quality degradation, spatial characteristics of the object and/or the ambient signal.

In the implemented embodiments the object separation and noise suppression artifacts are designed to be masked by ambient noise and not audible. Furthermore it is the aim of the implemented embodiments to improve the perceived object separation and noise suppression quality. The embodiments furthermore adapt object separation and noise suppression with the changes in the audio scene over time. Furthermore in some embodiments implementation should require a lower power consumption because computation load adapts with the input signal. In other word there is no unnecessary processing if there are no audible gains.

In the following examples there is discussed a sound source part and residual part of the captured microphone audio signals. The sound source part (or as can be referred to by the interchangeable terms such as audio object, sound object, audio source) can also be known as a direct audio signal part and refers to the signal arriving directly from the sound source. Whereas the residual or ambient part (the term is used interchangeably) refers to echoes and background noise existing in the environment.

FIG. 1 for example shows apparatus suitable for implementing some embodiments.

The apparatus in this example shows microphone inputs 101 which are configured to obtain or receive multiple microphone input audio signals (from physically separate or otherwise microphones). There can be any suitable number of microphones and/or microphone-arrays. For example in some embodiments there can be a spherical array of microphones with a sufficient number of microphones (e.g., 30 or more), or VR cameras with microphones mounted on its surface. The microphone audio signals 108 can be passed to the object separator 103 and the ambience capturer 105. In some embodiments the microphone audio signals are processed prior to being passed to the object separator 103 and the ambience capturer 105. For example the microphone audio signals can be converted to the time-frequency domain using a suitable time-frequency transformer.

In some embodiments the apparatus comprises an object separator 103. The object separator 103 is configured to obtain the multiple microphone audio signals and generate audio signals related to an audio object. An example of the audio signals related to an audio object would be for example the audio signals associated with a person speaking or singing, an instrument, or other audio generating object such as an animal or inanimate object. Any suitable object separation process can be employed in these embodiments. Practically the audio signal output from the object separator can also contain other audio energy due to limitations in microphone locations and number of microphones. In some embodiments the object separator 103 is configured to generate multiple sets of audio signals, each related to a different identified object. The object separator 103 in some embodiments is configured to output the object audio signals 104 to the noise suppressor and the loudness measurer 107.

Furthermore the apparatus comprises an ambience capturer 105. The ambience capturer is configured to obtain the microphone audio signals and generate ambient sound audio signals 106. Any suitable ambience determination process can be employed in these embodiments. Practically (in a manner similar to above) the ambience audio signal output from the ambience capturer 105 can also contain object related audio energy due to limitations in microphone locations and number of microphones. The ambience capturer 105 can output the ambient sound audio signals 106 to the loudness capturer and to an audio signal output (or combiner) 111.

The audio object separator 103 and/or ambience capturer 105 can in some embodiments use different microphones and/or signal processing techniques such as beamforming to accomplish their tasks. It is also possible to separate the object audio signal using known AI/ML (Artificial Intelligence/Machine Learning) methods.

AI/ML separation methods are known to create artefacts. Controlling an AI/ML method may include using different AI/ML methods, in particular AI/ML methods that are trained with different audio samples. For example, an AI/ML method that is used to separate only speech and has been trained with speech+noise samples only can be used alternatively with an AI/ML method that is trained using speech+music+noise samples. A speech+noise only trained AI/ML method will typically cause more artefacts for speech objects when there is music and noise in the background than a speech+music+noise trained AI/ML method while the former achieves better separation for speech objects when there is only noise in the background.

The loudness measurer 107 in some embodiments is configured to obtain the outputs of the object separator 103 and ambience capturer 105, which compares the levels of the audio signals. The comparison in some embodiments is divided into frequency bands that are relevant for human hearing. In some embodiments a loudness model is used which combines spectral and temporal characteristics to model human hearing and determine, which parts of the audio signals are audible.

The loudness measurer 107 is configured to output control signals to the noise suppressor 109 (and the audio object separator 103). For example in some embodiments the loudness measurer 107 is configured to determine that if the loudness measurement of the ambience capturer output is loud enough that it masks critical parts of the object separation signal, then the loudness measurer 107 is configured to control the audio object separator 103 and noise suppressor 109 such that it is configured to apply a more radical processing to the object separation and noise suppression operations because artifacts caused by the more radical processing are likely to be masked by the ambient sound. Similarly in some embodiments when the ambient sound level is determined to be low, the loudness measurer 107 is configured to control the audio object separator 103 and noise suppressor 109 such that the object separation and noise suppression operations are more conservative.

The noise suppressor 109 is configured to receive the output of the audio object separator 103 and control signals from the loudness measurer 107. The noise suppressor 109 is then configured to apply a noise suppression operation to the audio object audio signals based on the control signals from the loudness measurer 107. The output of the noise suppressor 109 can then be passed to the audio signal output 111.

The audio signal output 111 is configured to receive the outputs of the noise suppressor 109 and the ambience capturer 105 and output the audio signals. In some embodiments the audio signal output 111 is configured to output a bitstream comprising the noise suppressed audio object audio signals and the ambience audio signals.

Figure 2:
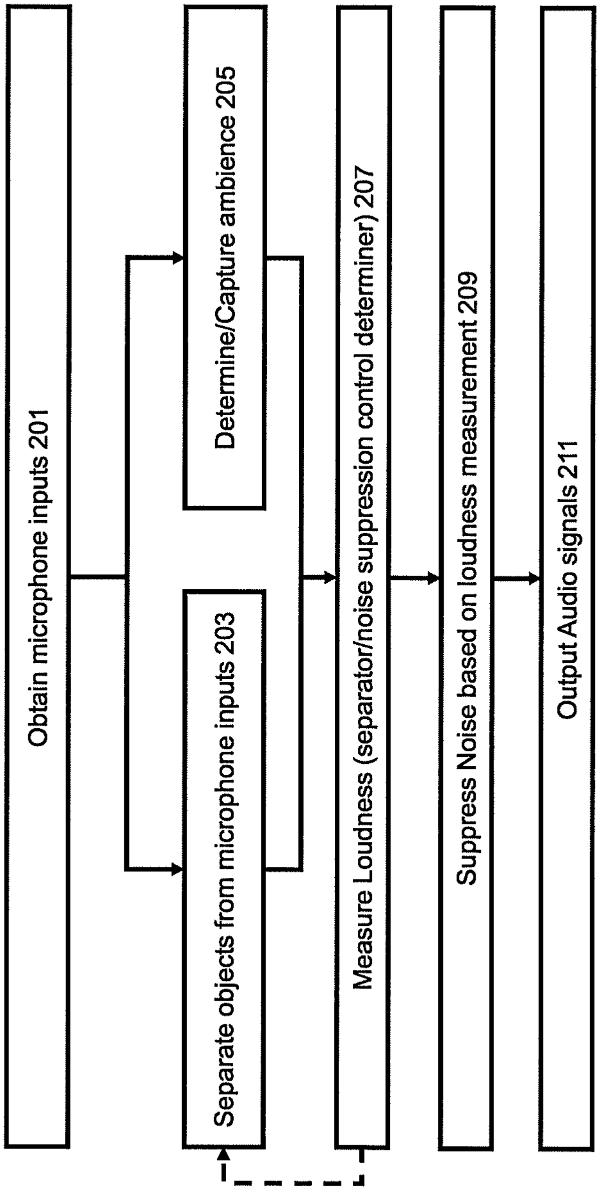
FIG. 2 shows a flow diagram of the operations of the apparatus shown in FIG. 1 according to some embodiments.

With respect to FIG. 2 is shown a flow diagrams of the example operations of the apparatus as shown in FIG. 1.

Thus for example is shown the microphone inputs being obtained as shown in FIG. 2 by step 201.

Then is shown the determination/capturing of the ambience sound audio signals as shown in FIG. 2 by step 205.

Also is shown the separation of the object audio signals from the microphone audio signals in FIG. 2 by step 203.

Then is shown a measurement of loudness and the determination of control signals based on the measured loudness, the control signals being used to feedback and control the separation of the object audio signals as shown in FIG. 2 by step 207.

Additionally is shown the suppression of noise from the audio object audio signals based on the control signals in FIG. 2 by step 209.

Then the processed audio signals (both the noise suppressed audio object audio signals and the ambience audio signals) can be output as shown in FIG. 2 by step 211.

Figure 3:
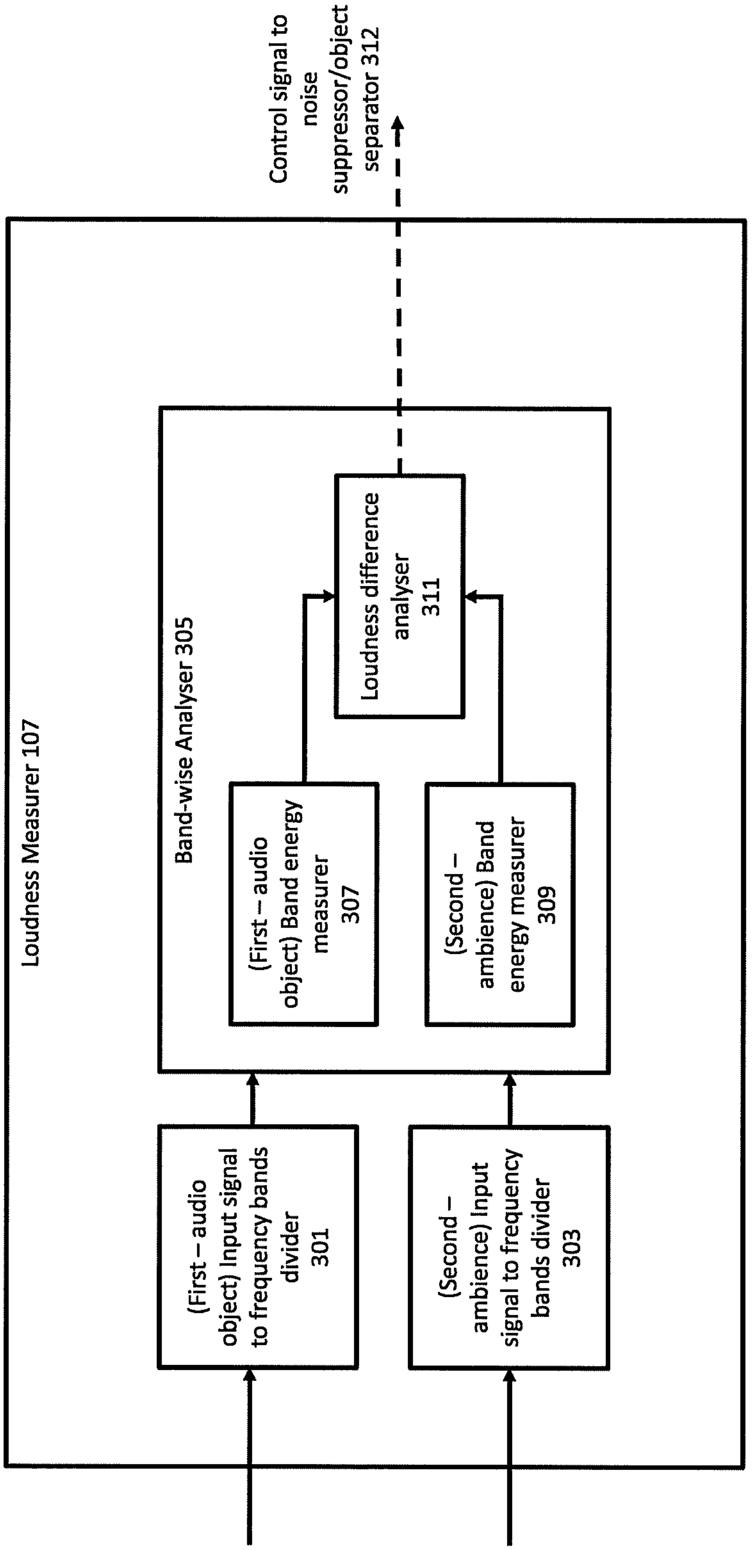
FIG. 3 shows schematically an example loudness measurer as shown in FIG. 1 according to some embodiments.

With respect to FIG. 3 is shown an example loudness measurer 107 in further detail.

The loudness measurer 107 is configured to obtain or receive the object separator audio signals 104 at a first input and the ambience capturer audio signals 106 at a second input. The loudness measurer 107 furthermore comprises a first input signal to frequency bands divider 301 which is configured to select or divide or otherwise determine the frequency bands from the object separator audio signals. In some embodiments the divider (and any frequency divider described herein) is configured to divide the audio signal in any suitable frequency band arrangement. For example the divider can in some embodiments generate critical bands, third octave bands, or bark bands. The loudness measurer 107 furthermore comprises a second input signal to frequency bands divider 303 which is configured to select or divide or otherwise determine the frequency bands from the ambience audio signals. The frequency band divider in some embodiments is implemented using a suitable filter bank.

These frequency bands can be passed to a band-wise analyser 305. The band-wise estimator 205 in some embodiments comprises a (First—audio object) Band energy measurer 307 configured to, for each frequency band, determine or calculate audio signal energy associated with the audio object audio signal.

The band-wise estimator 305 furthermore in some embodiments comprises a (Second—ambience) Band energy measurer 307 configured to, for each frequency band, determine or calculate audio signal energy associated with the ambience audio signal.

The band-wise estimator 305 furthermore in some embodiments comprises a loudness difference analyser 311. The loudness difference analyser 311 is configured to analyse the difference in energy levels (for a corresponding frequency band) between the audio object audio signal and the ambience audio signal. The difference in band energy is related to how much one signal masks the other. The result of the comparison can then be used to generate control parameters or signals 312 which can be passed the object separator to control object separation or noise suppressor to control noise suppression.

Figure 4:
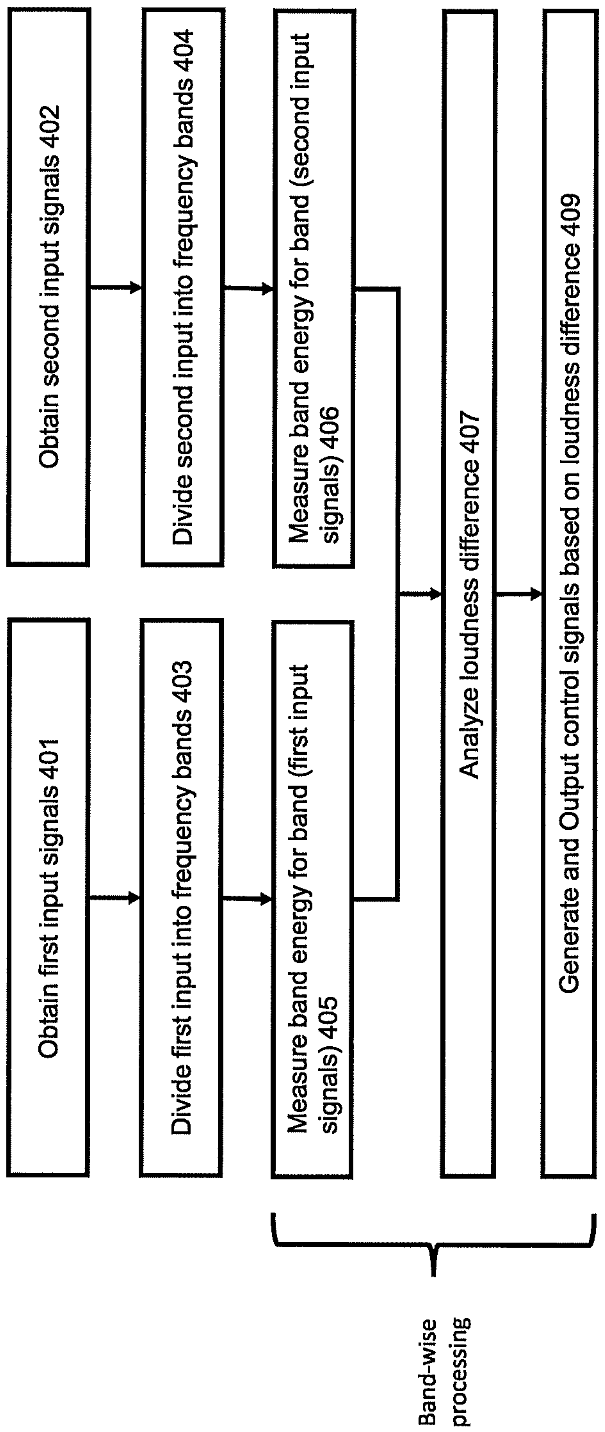
FIG. 4 shows a flow diagram of the operations of the example loudness measurer shown in FIG. 3 according to some embodiments.

With respect to FIG. 4 is shown a flow diagram of the loudness measurer example shown in FIG. 3.

Thus is shown the operation of obtaining the first (audio object audio signal) input signals as shown in FIG. 4 by step 401.

This first input signal is then divided into the frequency bands as shown in FIG. 4 by step 403.

The energy for the frequency bands for the first input signal can then be determined as shown in FIG. 4 by step 405.

Also shown is the operation of obtaining the second (ambience audio signal) input signals as shown in FIG. 4 by step 402.

The second input signal is then divided into the frequency bands as shown in FIG. 4 by step 404.

The energy for the frequency bands for the second input signal can then be determined as shown in FIG. 4 by step 406.

Also on a band-wise processing the loudness difference is determined between the first and the second input signals as shown in FIG. 4 by step 407.

Then based on the loudness difference control signals are generated and output as shown in FIG. 4 by step 409.

Figure 5:
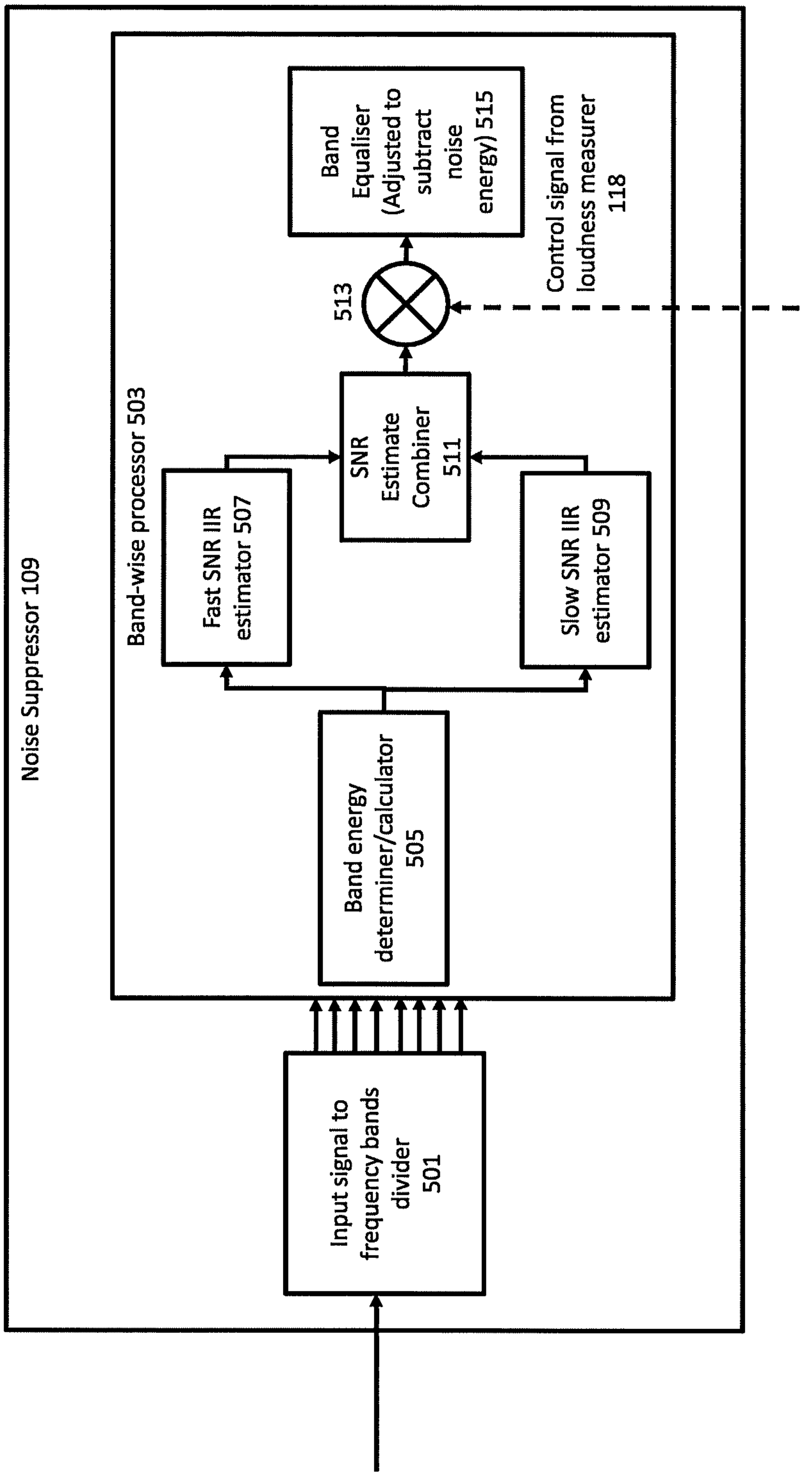
FIG. 5 shows schematically an example noise suppressor as shown in FIG. 1 according to some embodiments.

With respect to FIG. 5 is shown an example noise suppressor 109 in further detail according to some embodiments. In this example the noise suppressor 109 comprises an input signal to frequency bands divider 501 which is configured to obtain the first (audio object audio signals) input audio signal and divide the audio signal into frequency bands. The frequency bands can then be passed to a band-wise processor 503.

The band-wise processor 503 in some embodiments comprises a band energy determiner/calculator 505 which is configured to receive the frequency band parts of the audio objection audio signals and determine the energy (on a band-wise basis). In some embodiments the band energy has been determined previously (for example in the loudness estimator) and this value is used. The band energy values can be passed to a fast signal to noise ratio (SNR) infinite-impulse-response (IIR) estimator 507 and a slow signal to noise ratio (SNR) infinite-impulse-response (IIR) estimator 509.

The fast signal to noise ratio (SNR) infinite-impulse-response (IIR) estimator 507 and slow signal to noise ratio (SNR) infinite-impulse-response (IIR) estimator 509 operate in parallel and track the signal energy and produce and estimate the signal-to-noise ratio.

The band-wise estimator 503 furthermore comprises a signal to noise ratio (SNR) estimate combiner 511 configured to receive the outputs of the fast signal to noise ratio (SNR) infinite-impulse-response (IIR) estimator 507 and the slow signal to noise ratio (SNR) infinite-impulse-response (IIR) estimator 509 and combine them (with a weighting) to generate a combined SNR which is passed to a multiplier 513.

A multiplier 513 receives the combined SNR estimate and further a control signal from the loudness measurer and the output of the controller is configured to adjust the gain of an equalizer for the band which is applied to the band of the audio object audio signal. In other words the equalizer is configured to apply a negative gain that equals the amount of estimated noise.

As the noise estimate is not completely accurate, blindly applying a negative gain to the band equalizer 515 that matches the estimate may cause artifacts to the output signal. Thus applying a smaller gain on the equalizer is configured to suppress less noise but produce less processing artifacts on the output signal.

In these embodiments the effect of the multiplier 513 (where the information from the loudness estimator controls the degree of the noise estimate passed to adjust the equaliser. When the loudness of the ambient sound on the current frequency band grows louder relative to the object audio on the same band, the multiplier that controls the equalizer gain also grows larger. The interpretation is that stronger noise suppression can be used because the ambient noise will mask artifacts produced by noise suppression.

Figure 6:
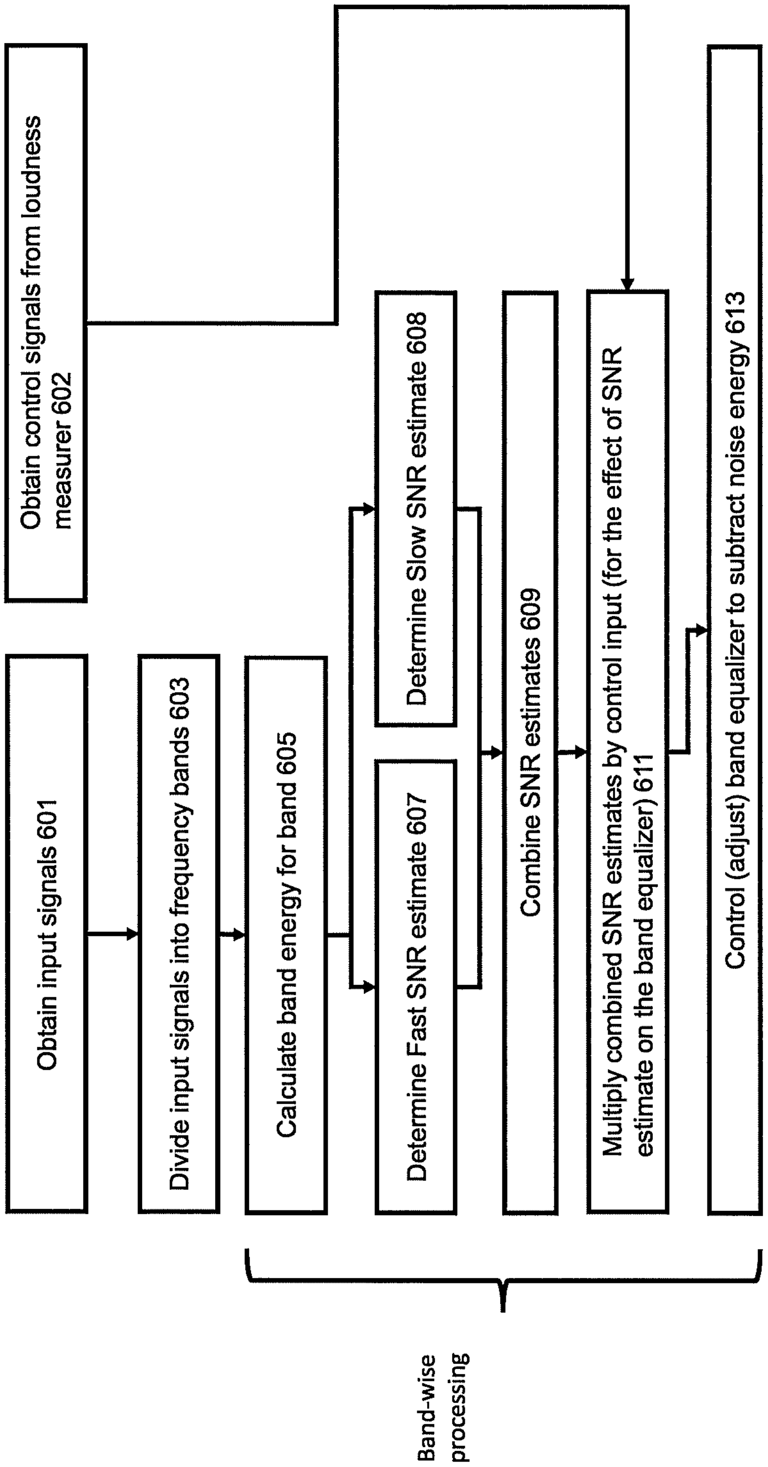
FIG. 6 shows a flow diagram of the operations of the example noise suppressor shown in FIG. 5 according to some embodiments.

With respect to FIG. 6 is shown a flow diagram showing the operations of the example noise suppressor shown in FIG. 5.

Thus is shown the operation of obtaining the first (audio object audio signal) input signals as shown in FIG. 6 by step 601.

This first input signal is then divided into the frequency bands as shown in FIG. 6 by step 603.

The energy for the frequency bands for the first input signal can then be determined as shown in FIG. 6 by step 605.

Then a fast SNR estimate as shown in FIG. 6 by step 607 and a slow SNR estimate as shown in FIG. 6 by step 608 are objected in parallel.

The fast and slow SNR estimates are then combined as shown in FIG. 6 by step 609.

Also shown is the operation of obtaining the control signals from the loudness measurer as shown in FIG. 6 by step 602.

The combined SNR estimate is then multiplied by the control signals from the loudness measurer as shown in FIG. 6 by step 611.

The modified combined SNR estimate can then be used to control a band equalizer gain to subtract or suppress the noise energy for the band as shown in FIG. 6 by step 613.

Figure 7:
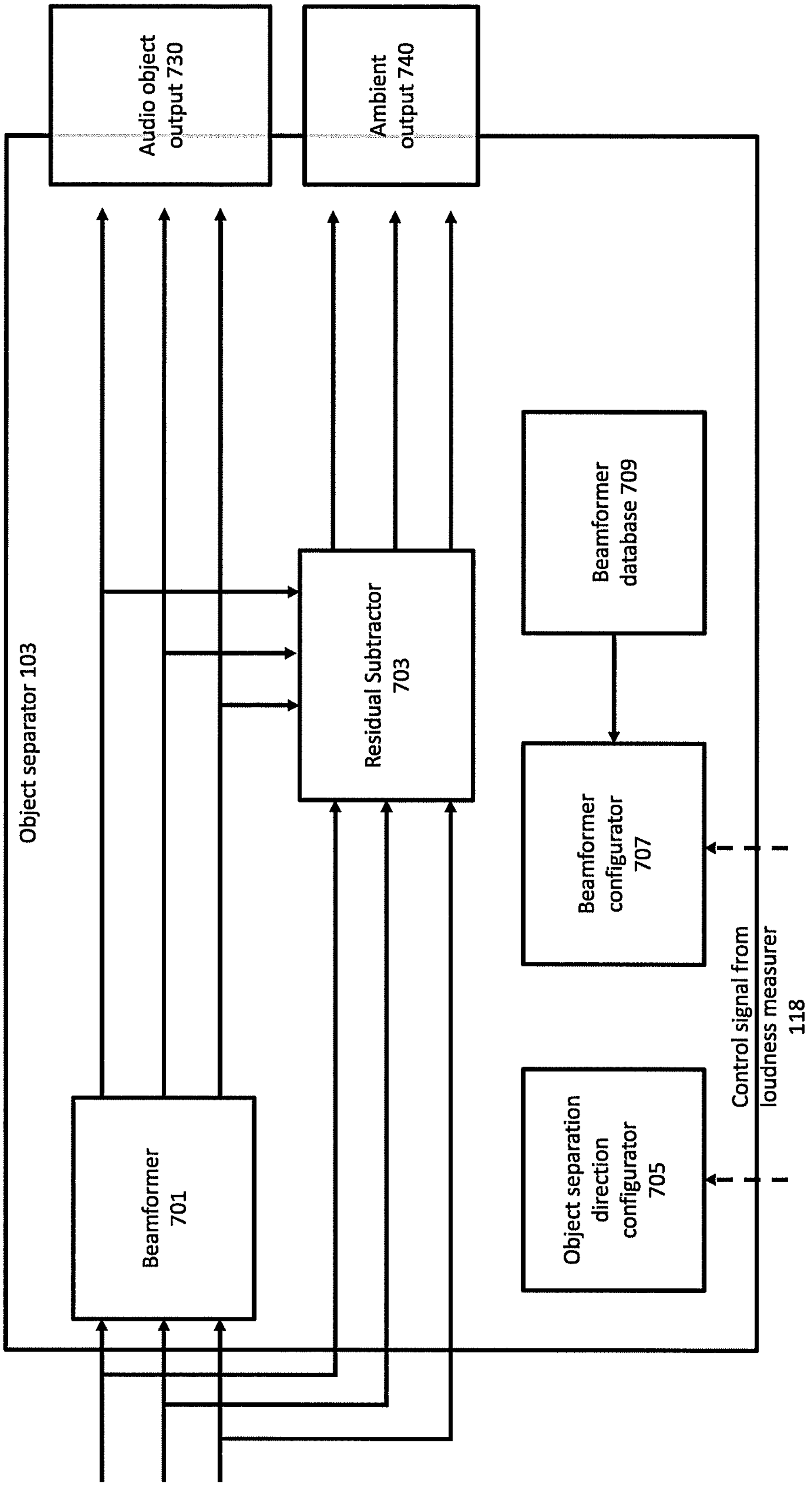
FIG. 7 shows schematically an example object separator as shown in FIG. 1 according to some embodiments.

With respect to FIG. 7 is shown an example object separator 103 according to some embodiments. In this example it is also shown how the object separation is controlled by the loudness measurement.

In this example the object separation is implemented by a beamformer 701. A beamformer 701 is configured to apply a beamforming operation selected input microphones. The result of which produces an audio signal which comprises the object audio and which can be output by the audio object output 730.

Furthermore as shown in FIG. 7 the ambient sound can be created (the ambience capturer) by subtracting the object audio from the unprocessed input signal. The remaining residual signal is the ambient sound which can be passed via an ambient output 740.

In some embodiments the control signal from the loudness measurer 118 is configured to be passed to an object separation direction configurator 705 and beamformer configurator 707.

The object separation direction configurator 705 thus can also be configured to receive the beamforming direction from an external control. This could be, e.g., set by user or detected automatically. The beamforming coefficients for the selected direction are selected from a database 709 of precalculated beamforming coefficients. The database 709 can be configured to contain the coefficients and metadata such as direction and width of the main lobe per frequency band and characteristics of the beam pattern such as per-band suppression gains for other directions than the main lobe.

The beamforming configurator 707 in some embodiments is configured to first select all configurations that are applicable to the currently set object separation direction. The control data is then used to compare for each frequency band the ratio of loudness of ambient sound and object audio to the suppression values of the beamforming coefficients on that band.

Then if the ambient sound loudness in current frequency band is much larger than the object audio loudness, then the relevance of beamforming suppression on that band is low because the ambient sound will always mask the object sound.

Also if the ambient sound loudness in current frequency band is close to the loudness of the object audio, then the relevance of beamforming suppression on that band is high because the object audio can be recovered with efficient beamforming.

Furthermore if the ambient sound loudness in current frequency band is small compared to the loudness of the object audio, then the relevance of beamforming suppression on that band is low, because the object audio always masks the object sound.

Based on the above comparisons, a score can be determined or calculated for each set of beamforming coefficients by assigning a weight for the result of comparisons on each frequency band. The weights are summed to form the final score. The beamforming coefficients with the highest score then can be selected and implemented at the beamformer 701.

In some embodiments the beamformer configurator is configured to keep track of a window of most recent scores and selects the one which has been selected most recently. This is to avoid switching between beamforming coefficients too frequently.

Figure 8:
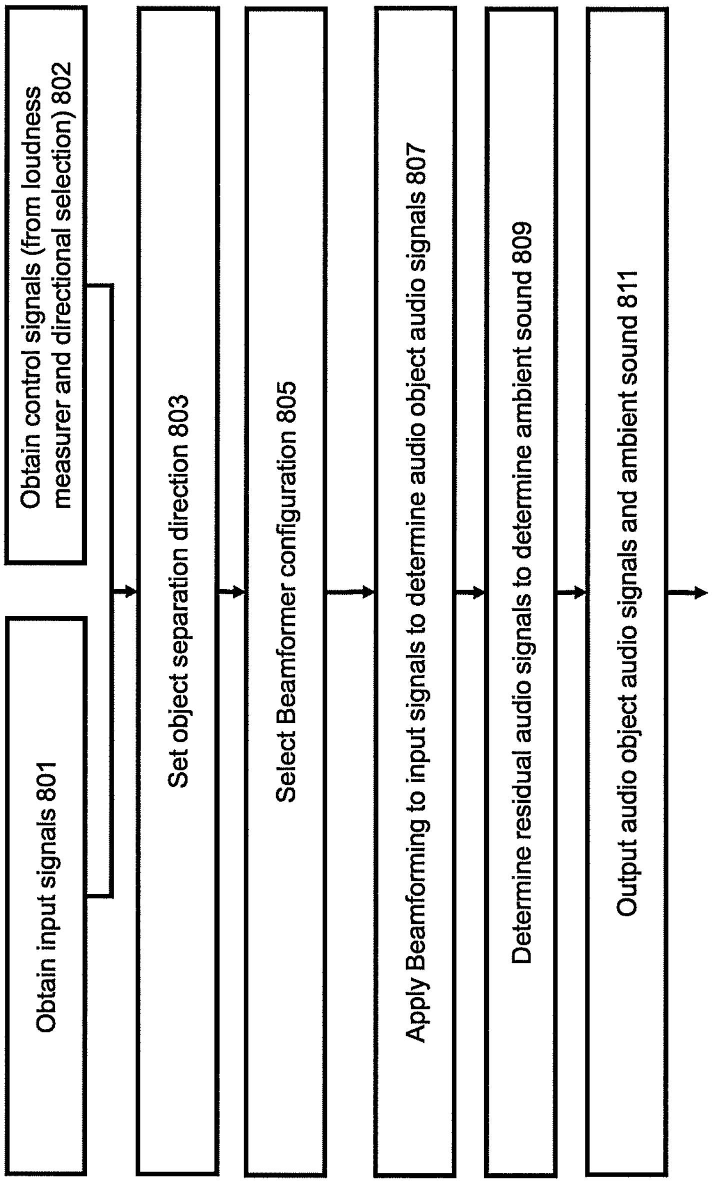
FIG. 8 shows a flow diagram of the operations of the example object separator shown in FIG. 7 according to some embodiments.

With respect to FIG. 8 is shown a flow diagram of the operation of the object separator as shown in FIG. 7.

Thus is shown the operation of obtaining the (microphone audio signals) input signals as shown in FIG. 8 by step 801.

Additionally is shown control signal being obtained from the loudness measurer and also directional selection control signals as shown in FIG. 8 by step 802.

The object separation direction can then be set as shown in FIG. 8 by step 803.

The beamformer configuration can then be determined as shown in FIG. 8 by step 805.

The selected beamformer configuration can then be applied to the input audio signals as shown in FIG. 8 by step 807.

The residual audio signals can then be determined as shown in FIG. 8 by step 809.

The audio object audio signals and ambient sound audio signals can then be output as shown in FIG. 8 by step 811.

Figure 9:
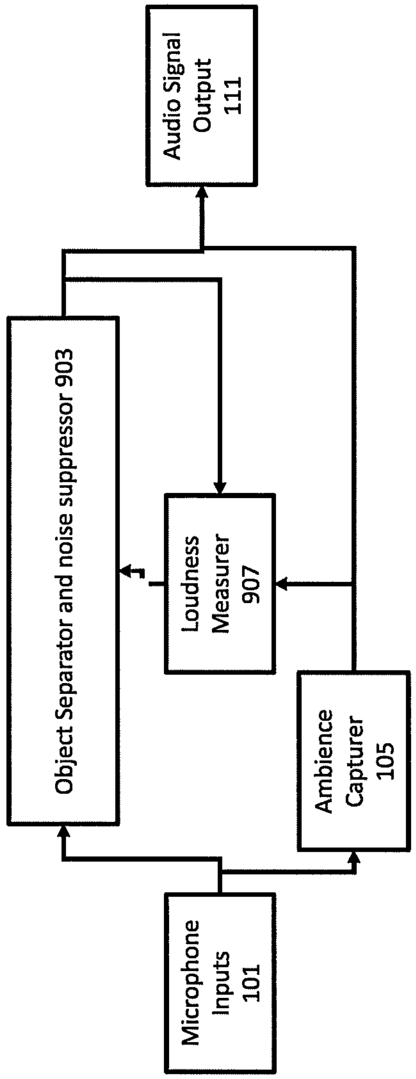
FIGS. 9 and 10 show schematically further example apparatus suitable for implementing some embodiments.

With respect to FIG. 9 is shown a further configuration of an apparatus suitable for implementing some embodiments. The apparatus shown in FIG. 9 differs from that shown in FIG. 1 where object separation and noise suppression are tightly coupled and acting as one logical module 903. The output of the combined object separator and noise suppressor 903 is passed to the loudness measurer 907 and compared to the output of the ambience capturer 105 and the control signals based on this comparison. This differs from the operations shown in the earlier embodiments because the effect of the noise suppression is also taken into account in the loudness measurement and comparison.

Figure 10:
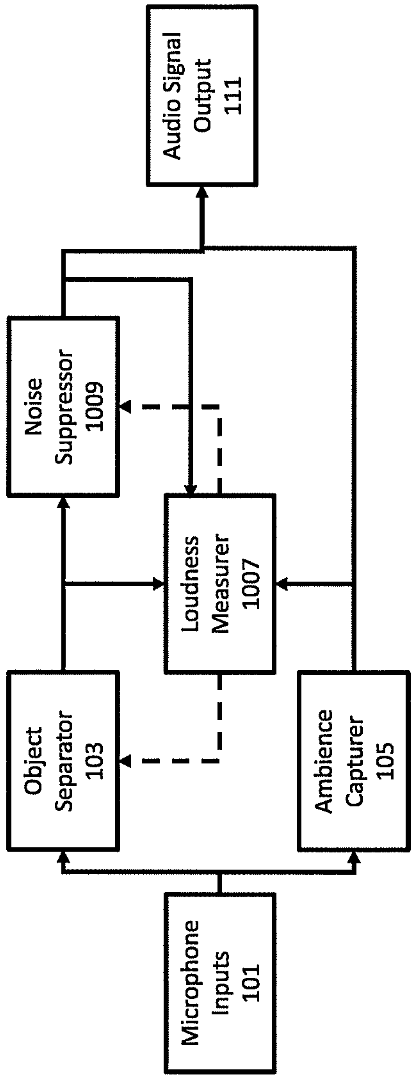

FIG. 10 shows a further configuration where the output of the object separator 103 and noise suppressor 1009 are passed separately to the loudness measurer 1007. In these embodiments the difference to the previous configurations is that the individual contributions of the objects separator or the noise suppressor can be discriminated and the control can be more fine grained. This approach is based more on measurement and less heuristic, because it is possible to measure the contribution of the object separation or the noise suppressor.

In some embodiments the auditory scene analysis may include determining audio energy distribution in different directions. This can be done using known methods such as beamforming or audio parameter analysis. Auditory scene analysis may compare the object direction to audio energy in the object direction and determine the masking of the object separation artefacts based on this.

Figure 11:
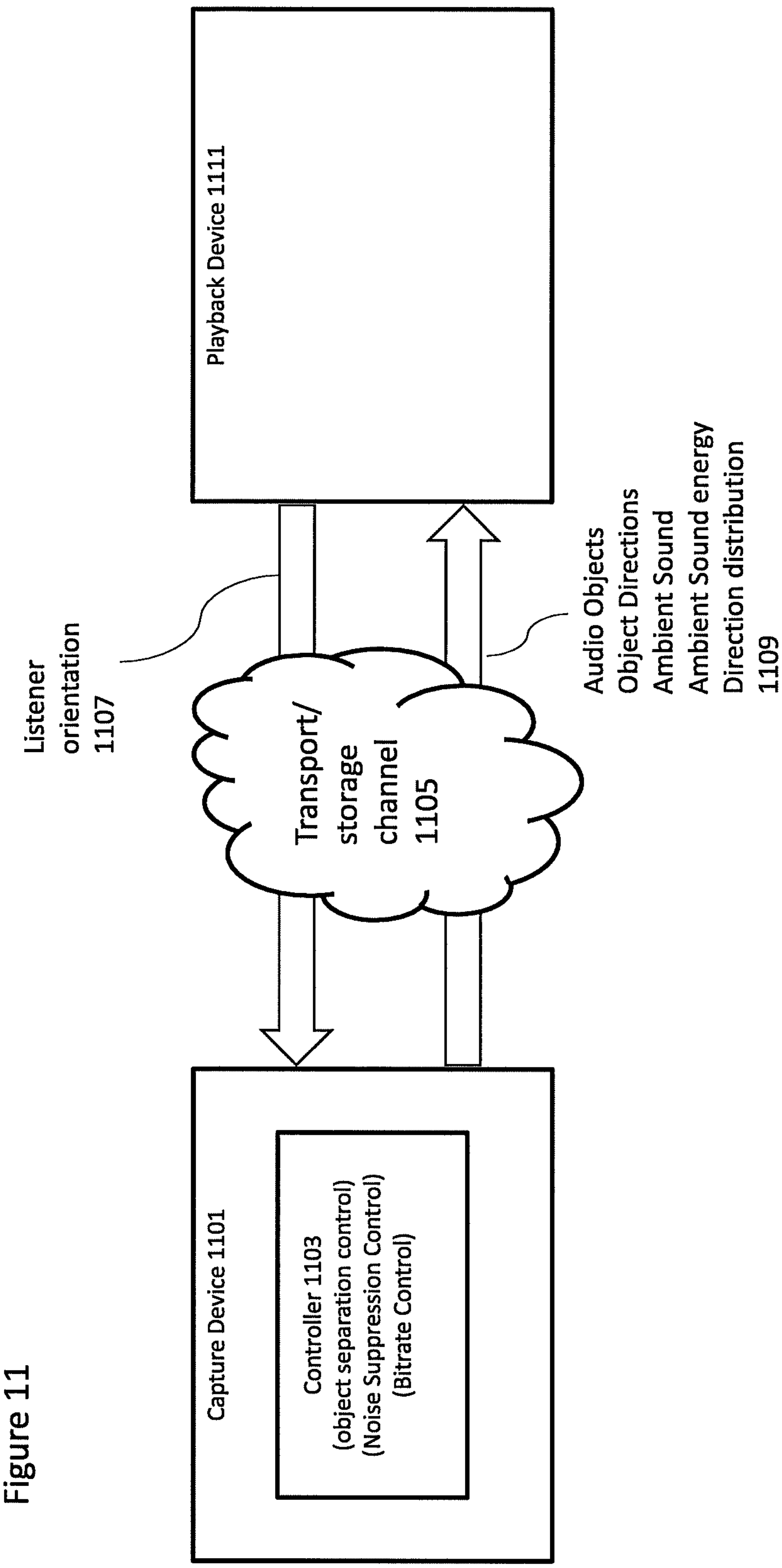
FIGS. 11 and 12 shows schematically example systems of apparatus comprising the apparatus as shown in earlier figures suitable for implementing embodiments.
Figure 12:
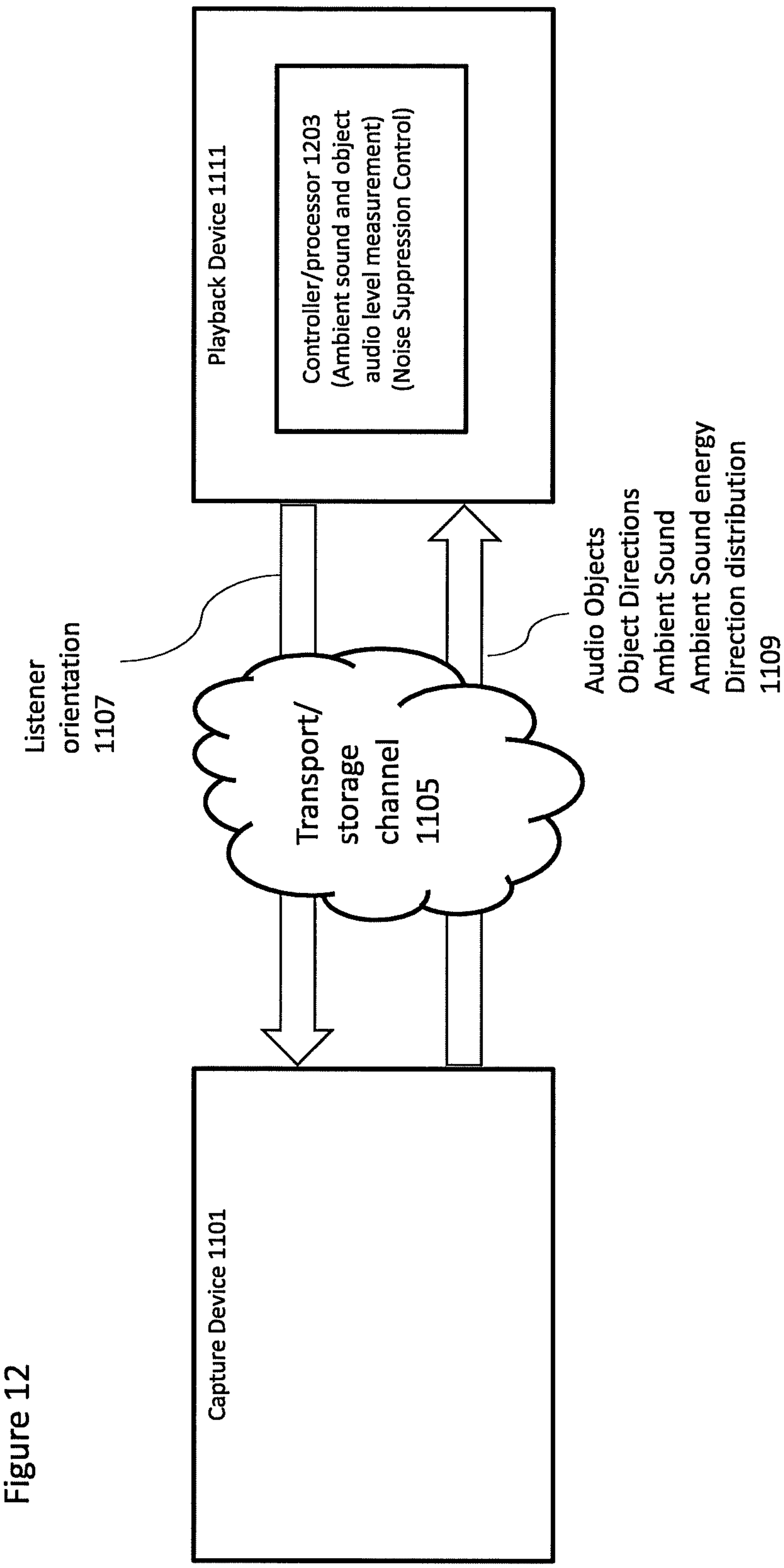

FIGS. 11 and 12 show end-to-end implementation of embodiments. With respect to FIG. 11 it is shown that there is a capture device 1103 and a playback device which communicate over a transport/storage channel 1105.

The capture device 1103 is configured as described above and is configured to sends audio streams 1109 of the audio objects and ambient sound. In addition, metadata about object directions and ambient sound directional energy distribution are transmitted. The playback device 1111 is further configured to send back data about the listener orientation 1107.

Listener orientation 1107 will affect the sound scene rendering. The masking of the audio objects by ambient noise will change with the orientation, which affects the control process that adjusts object separation and noise suppression parameters.

The capture device 1101 comprises the controller 1103 configured to generate object separation control, noise suppression control and bitrate control. In other words the controller 1103 is configured to tune the object separation and noise suppression parameters according to the listener orientation data received from the playback.

In addition to object separation and noise suppression, the capture device and the controller is configured to adjust encoding parameters such as bitrate according to the measured or estimated level difference of the audio objects and ambient sound. For example if the ambient sound is loud and masks much of the object audio, the bitrate can be set lower. Low bitrate will introduce coding artifacts, but those will be masked by the ambient sound.

In the above embodiments the object separation, noise suppression and the coding parameters can all be controlled based on the level difference between the audio object and residual (or ambience) parts of the captured audio signals. In some embodiments rather than determining level differences the control can be implemented based on an absolute level of the residual or ambience part. In such embodiments the ambience or ambient part being loud (or having a high level with respect to a defined threshold) will be indicative that the ambient sound is likely to mask much of the object audio and thus controls be determined in a manner similar to those above where masking if the object audio is likely.

With respect to the example shown in FIG. 12, there is shown a capture device 1103 and a playback device 1111 which communicate over a transport/storage channel 1105.

In this example the playback device 1111 comprises the controller 1203 configured to generate object separation control, noise suppression control and bitrate control. In other words the controller 1203 is configured to tune the object separation and noise suppression parameters according to the listener orientation data received from the playback.

The capture device thus sends audio objects, ambient sound, and metadata related to them over network. The playback device receives the audio and metadata, uses head tracking data to render the object audio and then measures the loudness difference between object audio and ambient sound to determine masking. The loudness difference may be estimated using the sent audio metadata that includes spatial parameters of sound.

The loudness difference may be estimated in the direction of the object sound because when sounds in the ambience are in the same direction as the object sound then they mask the artefacts in the object sound better than when sounds in the ambience are in other directions that the object sound. The result is used to control the parameters of noise suppression, which happens in the playback. Again, if ambient sound is dominant, more noise suppression artifacts are allowed on the object audio signals.

Figure 13:
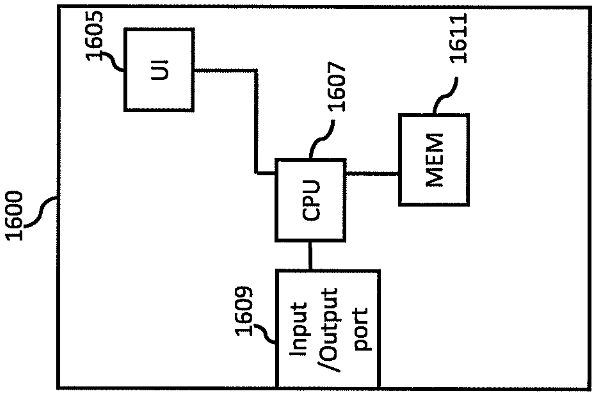
FIG. 13 shows schematically an example device suitable for implementing the apparatus shown.

With respect to FIG. 13 an example electronic device which may be used as the computer, encoder processor, decoder processor or any of the functional blocks described herein is shown. The device may be any suitable electronics device or apparatus. For example in some embodiments the device 1600 is a mobile device, user equipment, tablet computer, computer, audio playback apparatus, etc.

In some embodiments the device 1600 comprises at least one processor or central processing unit 1607. The processor 1607 can be configured to execute various program codes such as the methods described herein.

In some embodiments the device 1600 comprises a memory 1611. In some embodiments the at least one processor 1607 is coupled to the memory 1611. The memory 1611 can be any suitable storage means. In some embodiments the memory 1611 comprises a program code section for storing program codes implementable upon the processor 1607. Furthermore in some embodiments the memory 1611 can further comprise a stored data section for storing data, for example data that has been processed or to be processed in accordance with the embodiments as described herein. The implemented program code stored within the program code section and the data stored within the stored data section can be retrieved by the processor 1607 whenever needed via the memory-processor coupling.

In some embodiments the device 1600 comprises a user interface 1605. The user interface 1605 can be coupled in some embodiments to the processor 1607. In some embodiments the processor 1607 can control the operation of the user interface 1605 and receive inputs from the user interface 1605. In some embodiments the user interface 1605 can enable a user to input commands to the device 1600, for example via a keypad. In some embodiments the user interface 1605 can enable the user to obtain information from the device 1600. For example the user interface 1605 may comprise a display configured to display information from the device 1600 to the user. The user interface 1605 can in some embodiments comprise a touch screen or touch interface capable of both enabling information to be entered to the device 1600 and further displaying information to the user of the device 1600.

In some embodiments the device 1600 comprises an input/output port 1609. The input/output port 1609 in some embodiments comprises a transceiver. The transceiver in such embodiments can be coupled to the processor 1607 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1609 may be configured to transmit/receive the audio signals, the bitstream and in some embodiments perform the operations and methods as described above by using the processor 1607 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus to:

obtain at least two audio signals;

determine, with respect to the at least two audio signals, an audio object part and an ambience audio part;

determine a level parameter based, at least partially, on the ambience audio part and the audio object part;

apply a noise suppression to the audio object part, wherein the noise suppression is configured to be controlled based on the determined level parameter; and generate a noise suppressed audio object part based on the applied noise suppression and the audio object part.

2. The apparatus as claimed in claim 1, wherein the instructions, when executed with the at least one processor, cause the apparatus to:

combine the noise suppressed audio object part and the ambience audio part to generate an output audio signal; and output and/or store the output audio signal.

3. The apparatus as claimed in claim 1, wherein the instructions, when executed with the at least one processor, cause the apparatus to:

separate the at least two audio signals into the determined audio object part and the ambience audio part; and generate an audio object part audio signal based on a previous time level parameter.

4. The apparatus as claimed in claim 3, wherein the instructions, when executed with the at least one processor, cause the apparatus to:

determine an object separation direction parameter;

determine a focuser configuration based on the object separation direction parameter and the previous time level parameter; and apply the focuser configuration to the at least two audio signals to generate the audio object part audio signal.

5. The apparatus as claimed in claim 4, wherein the instructions, when executed with the at least one processor, cause the apparatus to:

generate a first focuser filter with a first spatial width based on the previous time level parameter being equal to or more than a first value; and generate a second focuser filter with a second spatial width based on the previous time level parameter being less than the first value, wherein the second spatial width is smaller than the first spatial width and the second focuser filter is more spatially selective than the first focuser filter.

6. The apparatus as claimed in claim 4, wherein applying the focuser configuration to the at least two audio signals comprises the instructions, when executed with the at least one processor, cause the apparatus to:

remove the audio object part audio signal from the at least two audio signals to generate the ambience audio part.

7. The apparatus as claimed in claim 1, wherein the instructions, when executed with the at least one processor, cause the apparatus to:

generate, with respect to a first time period, a first signal-to-noise ratio based on the audio object part of the at least two audio signals and the ambience audio part;

generate, with respect to a second time period, a second signal-to-noise ratio based on the audio object part of the at least two audio signals and the ambience audio part, wherein the first time period is shorter than the second time period;

combine the first and second signal-to-noise ratios to generate a combined signal-to-noise ratio;

multiply the combined signal-to-noise ratio with a factor based on the level parameter to generate a noise suppression filter parameter; and apply a noise suppression filter with the noise suppression filter parameter to the audio object part.

8. The apparatus as claimed in claim 1, wherein the level parameter comprises a level difference between the audio object part and the ambience audio part.

9. The apparatus as claimed in claim 8, wherein the level difference is determined further based on the noise suppressed audio object part.

10. The apparatus as claimed in claim 1, wherein the level parameter is determined based, at least partially, on an absolute level of the ambience audio part.

11. The apparatus as claimed in claim 1, wherein the level parameter is determined for defined or selected frequency bands.

12. The apparatus as claimed in claim 11, wherein applying the noise suppression comprises the instructions, when executed with the at least one processor, cause the apparatus to:

apply the noise suppression to the defined or selected frequency bands.

13. A method comprising:

obtaining at least two audio signals;

determining, with respect to the at least two audio signals, an audio object part and an ambience audio part;

determining a level parameter based, at least partially, on the ambience audio part and the audio object part;

applying a noise suppression to the audio object part, wherein the noise suppression is configured to be controlled based on the determined level parameter; and generating a noise suppressed audio object part based on the applied noise suppression and the audio object part.

14. The method as claimed in claim 13, wherein the method further comprises:

combining the noise suppressed audio object part and the ambience audio part to generate an output audio signal; and outputting and/or storing the output audio signal.

15. The method as claimed in claim 13, further comprising:

separating the at least two audio signals into the determined audio object part and the ambience audio part;

wherein generating the noise suppressed audio object part based on the applied noise suppression comprises:

generating an audio object part audio signal based on a previous time level parameter.

16. The method as claimed in claim 15, wherein generating the audio object part audio signal based on the previous time level parameter comprises:

determining an object separation direction parameter;

determining a focuser configuration based on the object separation direction parameter and the previous time level parameter; and applying the focuser configuration to the at least two audio signals to generate the audio object part audio signal.

17. The method as claimed in claim 16, wherein determining the focuser configuration based on the object separation direction parameter and the previous time level parameter comprises:

generating a first focuser filter with a first spatial width based on the previous time level parameter being equal to or more than a first value; and generating a second focuser filter with a second spatial width based on the previous time level parameter being less than the first value, wherein the second spatial width is smaller than the first spatial width and the second focuser filter is more spatially selective than the first focuser filter.

18. The method as claimed in claim 16, wherein applying the focuser configuration to the at least two audio signals comprises:

removing the audio object part audio signal from the at least two audio signals to generate the ambience audio part.

19. The method as claimed in claim 13, wherein applying the noise suppression to the audio object part comprises:

generating, with respect to a first time period, a first signal-to-noise ratio based on the audio object part of the at least two audio signals and the ambience audio part;

generating, with respect to a second time period, a second signal-to-noise ratio based on the audio object part of the at least two audio signals and the ambience audio part, wherein the first time period is shorter than the second time period;

combining the first and second signal-to-noise ratios to generate a combined signal-to-noise ratio;

multiplying the combined signal-to-noise ratio with a factor based on the level parameter to generate a noise suppression filter parameter; and applying a noise suppression filter with the noise suppression filter parameter to the audio object part.

20. A non-transitory computer-readable medium comprising program instructions stored thereon for performing at least the following:

obtain at least two audio signals;

determine, with respect to the at least two audio signals, an audio object part and an ambience audio part;

determine a level parameter based, at least partially, on the ambience audio part and the audio object part;

apply a noise suppression to the audio object part, wherein the noise suppression is configured to be controlled based on the determined level parameter; and generate a noise suppressed audio object part based on the applied noise suppression and the audio object part.

* * * * *